July 14, 1953  B. T. NEAL  2,645,136
TRANSMISSION MECHANISM
Filed Feb. 11, 1950  3 Sheets-Sheet 1

INVENTOR.
Benjamin J. Neal
BY Warren H. J. Schmieding
his attorney

Patented July 14, 1953

2,645,136

UNITED STATES PATENT OFFICE 2,645,136

TRANSMISSION MECHANISM

Benjamin T. Neal, Columbus, Ohio

Application February 11, 1950, Serial No. 143,787

5 Claims. (Cl. 74—688)

The present invention relates to a transmission mechanism of the type in which the gear ratio is varied automatically in accordance with the changes in the load to be moved.

In the present invention, I utilize the factor of resistance offered by a liquid to the movement thereof. In accordance with the present invention, one element tends to move liquid, in which it rotates, at a certain velocity, while a juxtaposed element, tending to move the liquid at a different velocity affects the velocity of movement of the liquid and the ratio of movement of the elements.

Generally, the invention contemplates the use of a liquid containing a gear housing which is adapted to be rotated by a driving mechanism. Planetary gearing is contained within the gear housing. The driving and driven shafts are connected with the planetary gearing. One of the rotating elements is provided with a set of blades, arranged in a circular formation which tends to move the liquid at a certain velocity. One of the other rotating elements is also provided with a set of blades, arranged in a circular formation and juxtaposed to the first mentioned set of blades, and tends to move the liquid at a different velocity. The resultant of these forces is utilized to affect the relative speed of the rotating elements, and since one of these elements is a part of the planetary gearing, the speed of movement of the planetary gear about the sun gear is varied and this factor is utilized to change the relative speed of movement of the driven shaft with respect to the driving shaft.

More specifically, the liquid containing the gear housing and the sun gear, of the planetary gearing, are driven at the same speed. The gear housing is provided with a set of circularly arranged and inwardly extending blades which cause the revolving of the liquid. The ring gear of the planetary gear is free to rotate within the housing and it is also provided with a set of blades arranged in circular formation and is juxtaposed to the set of blades of the housing.

Further objects and advantages of the present invention will be apparent from the following description, reference being had to the accompanying drawings wherein preferred forms of embodiments of the invention are clearly shown.

Figure 1:
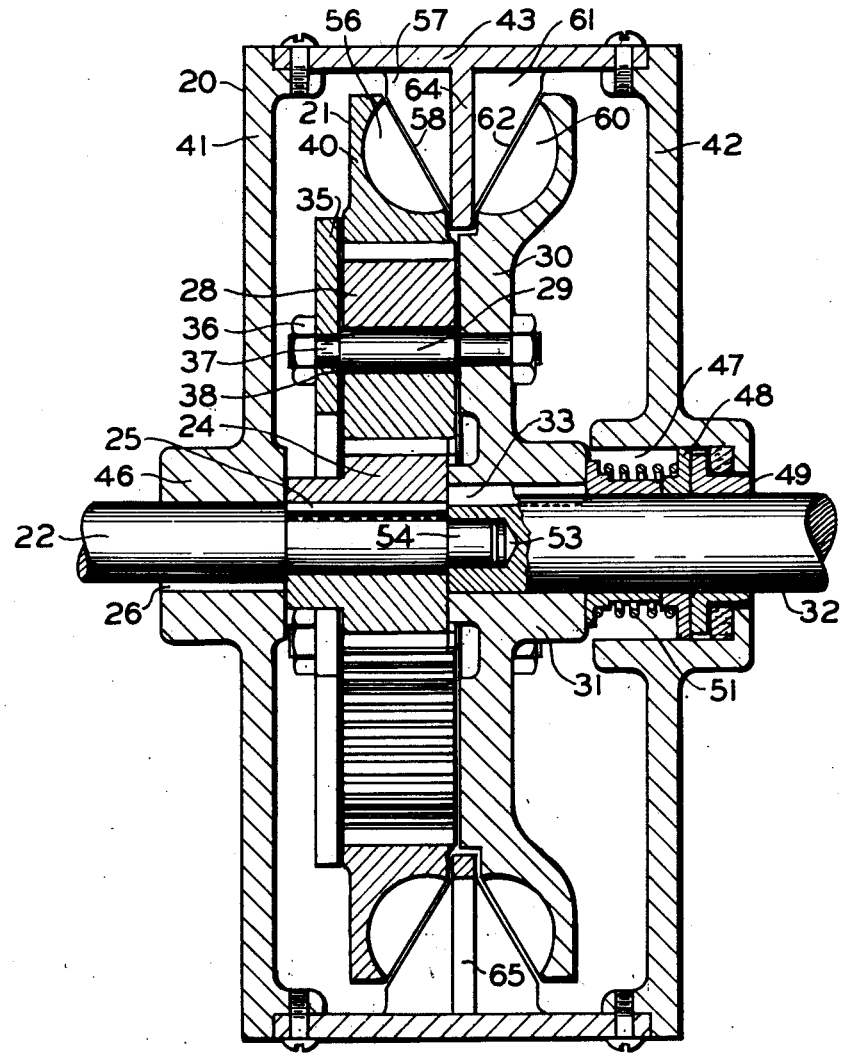
Fig. 1 is a sectional view of my transmission mechanism, the view being taken on line 1—1 of Fig. 2.

Referring to the drawings in general, there is provided a gear housing 20, which houses a system of planetary gearing 21. A driving shaft 22 extends into the gear housing and is keyed to the sun gear 24 of the planetary gearing 21 by a key 25. The shaft 22 is also keyed, by a key 26, to the housing 20. Three planetary gears 28 revolve about the periphery of sun gear 24, each being supported on a separate spindle 29, the spindles being disposed on a circular arc about the axis of the sun gear and at 120° to one another. The spindles 29 are carried by a plate or spider 30, having a hub 31 which is keyed to a driven shaft 32 by a key 33. The sidewise movement of the gears 28 is limited in one direction by the plate or spider 30 and in the other direction by a plate or spider 35, which latter is secured in place by nuts 36 threaded onto the reduced end portions 37 of the spindles 29, shoulder 38 being formed on each of the spindles to provide a desirable clearance between the sides of the gears and the plates 30 and 35. Suitable bearings (not shown) are provided for shafts 22 and 32.

A ring gear 40, of the planetary gearing 21, encircles the planetary gears 28. Sidewise movement thereof is limited by the plates 30 and 35. If, for example, the sun gear 24 rotates clockwise, as viewed in Fig. 2, the planetary gears 28 will rotate counterclockwise about their respective spindles 29 and since the ring gear 40 is free to rotate, it will revolve counterclockwise. The clockwise rotation of the sun gear 24 will impart a clockwise movement to the assembly, including the planetary gears 28, the plate 30 and the driven shaft 32, since resistance is offered by the ring gear 40. Preferably all gears are of the tooth type.

The housing 20 includes side plates 41 and 42, which are spanned by and connected with ring 43. The key 26 is keyed to the hub 46 of side plate 41 and shaft 22 is pressed into the hub.

Plate 42 is provided with a hollow hub-like portion 47 at the center thereof for housing a liquid seal for the housing 20. This seal includes a sealing ring 48 which is ground on its outwardly facing surface and abuts a ground sealing ring 49 carried by the hub-like portion 47 of plate 42. A coil spring 51 surrounds shaft 32 and is interposed between sealing ring 48 and the outwardly facing surface of hub 31 for the purpose of pressing ring 48 and ring 49 and for preventing shifting of the planetary gear assembly too far to the right, as viewed in Fig. 1.

In some installation it is desirable that the shafts 22 and 32 in themselves, aid in aligning the same. For this purpose, one of the shafts is provided with an axially aligned socket 53 which receives an axially aligned subshaft 54 of the other shaft.

Figure 2:
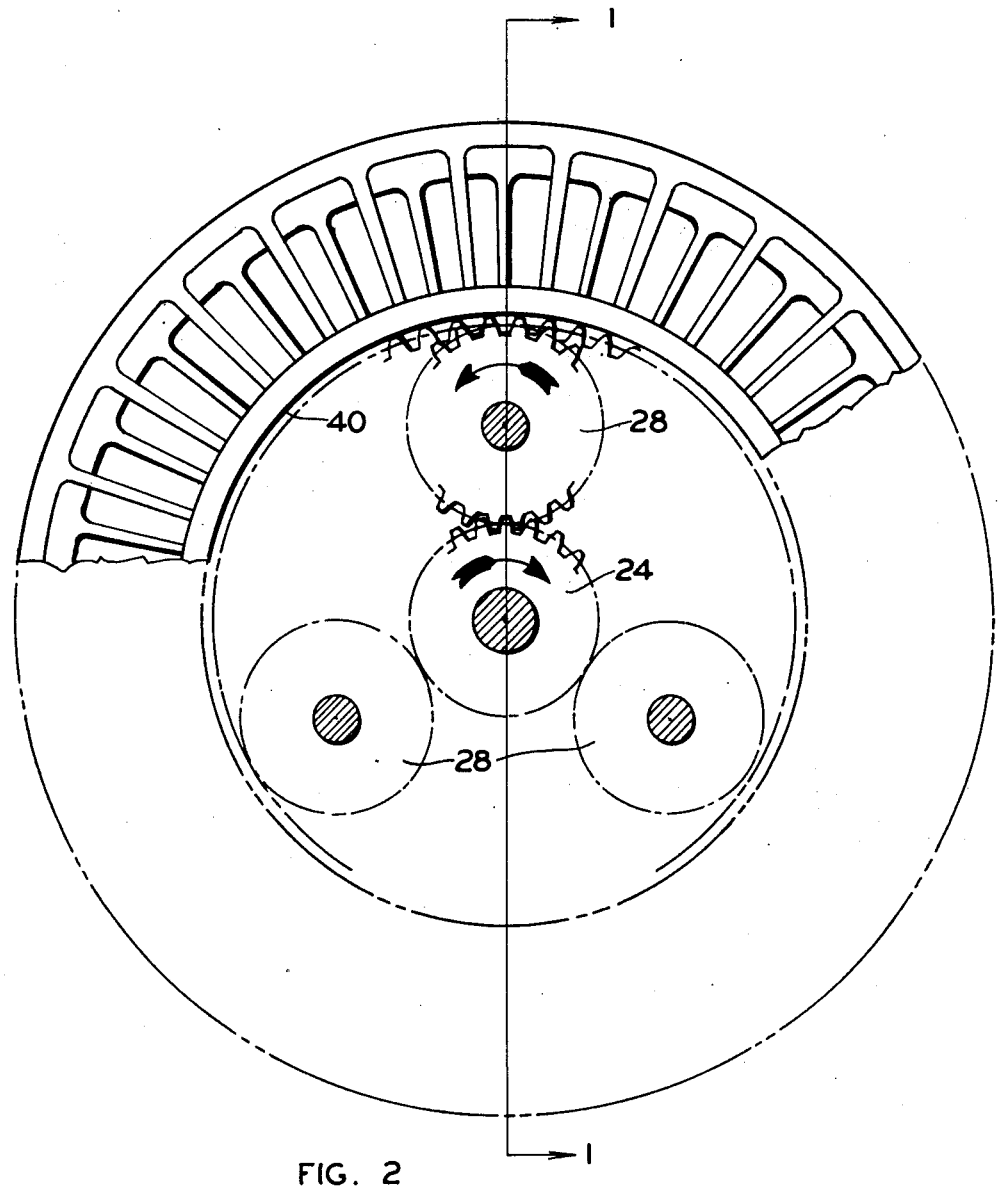
Fig. 2 is a sectional view taken on line 2—2 of Fig. 1.

In operation, for example, if shaft 22 is rotated in a clockwise direction, as viewed in Fig. 2, counterclockwise motion will be imparted to the planetary gears 28 about their respective spindles 29. The planetary gear assembly, including the planetary gears 28 and the plates 30 and 35, being associated with the ring gear 40, will tend to rotate in a clockwise direction and the ring gear 40 will tend to rotate counterclockwise. If the loaded torque on driven shaft 32 is of a certain high value, no movement will be imparted to the planetary gear assembly and the entire movement of the planetary gear system will be imparted to the ring gear 40. It is desirable to impose resistance to the movement of the ring gear 40 in addition to its inherent resistance to movement by reason of its mass and its friction of its teeth and the teeth on the planetary gears 28. This resistance is imposed by causing the same to rotate in a liquid contained within the gear housing. To augment this resistance, vanes or blades are formed adjacent the outer end of the ring gear 40. This set of blades is arranged in circular formation. The blades are shown at 56 in Fig. 1 and are formed by cutting away parts of the top and the right side of the ring gear. To further augment the movement of the ring gear counterclockwise, a complementary set of blades 57, arranged in circular formation, is cast integrally with the ring 43 and extends inwardly. The outer edges of the sets of blades 56 and 57 are slightly spaced from one another as indicated at 58.

While the sun gear is rotating in a clockwise direction, the housing 20 is also rotating in the same direction, and the liquid, pocketed between the blades 57 will be rotated in a clockwise direction also. The liquid pocketed between the blades 56 of the ring gear 40, in following the direction of the rotation of the ring gear 40, will be moving counterclockwise. When this occurs two forces in opposite directions are imposed upon the liquid adjacent the outer edges of the pockets and in the space 58. By increasing the power delivered to shaft 22 to thus increase the speed of movement of the liquid in the pockets formed by the blades 57, the frictional resistance offered by the liquid will impede the counterclockwise movement of the ring gear, and when this resistance is increased sufficiently, by the increasing of the speed of rotation of the housing, the ring gear movement will be decreased in speed to such an amount that the planetary gears will start rotating as an assembly, in a clockwise direction about the sun gear to rotate the shaft 32. By increasing the speed of rotation of the housing 20, the speed of the driven shaft 32 will be increased. As the torque load on the driven shaft 32 is decreased, the revolving speed of the planetary gear assembly will be increased as the load gradiently decreases, and simultaneously the speed of counterclockwise motion of the ring gear will gradually decrease to a condition in which it is stationary. Upon further decrease of the load on the shaft 32, the ring gear 40 will start to rotate in a clockwise direction and it will increase its speed in rotating in that direction as the load on the shaft 32 decreases. Obviously, further acceleration of rotation of the housing 20, will also cause the impeding of the counterclockwise direction of rotation of the ring gear and when the acceleration has reached a certain point, the ring gear will be reduced in speed to a stationary position and then upon further acceleration of the housing 20, the ring gear will start to rotate in a clockwise direction and the clockwise speed of movement will be increased as the acceleration of the housing is further increased.

Thus by the present invention the ratio of movement between shaft 22 and shaft 32 varies from infinite to substantially 1:1.

In the embodiment shown in Figs. 1 and 2, the plate or flange 30 extends radially at a greater distance than the plate 35 and is substantially coextensive with the outer periphery of the ring gear 40. This outwardly extending portion of plate 30 is bulged sidewise and is cut out in the same manner as ring gear 40 to provide a circularly arranged set of vanes or blades 60 for pocketing liquid. The ring 43 is provided with another set of vanes or blades 61 arranged to complement the vanes or blades 60. The confronting ends of these sets of vanes or blades 60 and 61 are spaced from one another as shown by the space 62. The sets of blades 57 and 61 are reenforced by a central rib 64. Openings 65 are formed in the rib 64 so as to provide for intercommunication between the pockets formed by the blades 57 and the pockets formed by the blades 61.

In the example of the direction of rotation as set forth, both the plate 30 and the liquid pockets provided by the blades 60 and the housing and the pockets provided by the blades 61 rotate in a clockwise direction. In this manner the oil between the blades 61 drives the oil between the blades 60 and in a clockwise direction. And in this manner the clockwise moving housing 20 augments the clockwise movement of the planetary gearing.

Figure 3:
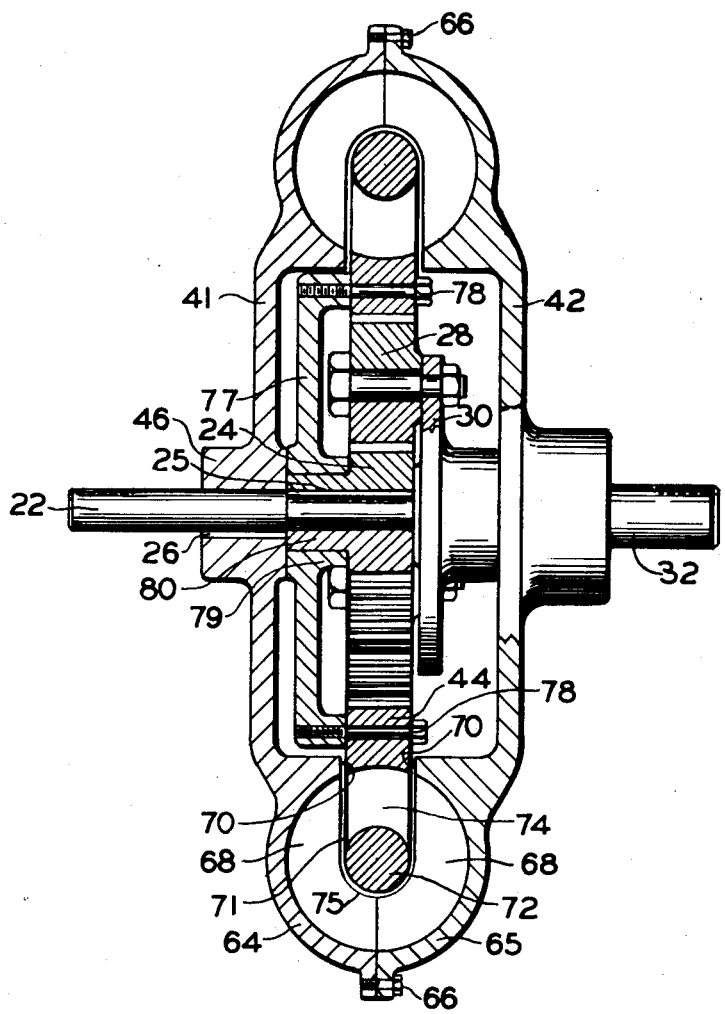
Fig. 3 is a sectional view similar to Fig. 1, but showing another embodiment of the invention.

In the embodiment shown in Fig. 3, the outer ends of the plates 41 and 42 are arcuately shaped as shown at 64 and 65 and these portions are connected with one another by bolts 66. Each of these plates has integrally formed therewith a set of vanes or blades 68, the inner ends of which are spaced from one another as shown at 70 to receive a radially extending portion 71 of the ring gear 44. This radially extending portion 71 includes a circular ring 72 which is joined to the main body of the ring gear 44 by vanes or blades 74. The outer side of the vanes or blades 74 are spaced slightly from the side edges of the vanes or blades 68, the spaces being shown at 75.

In the embodiment shown in Fig. 3, longitudinal movement of the ring gear 44 is limited by a spider or plate 77. The ring gear is attached to the spider or plate 77 by bolts 78 and the hub 79 is journalled on the hub 80 of the sun gear 24.

The functional purpose of the blades 68 and 74 is the same as the functional purpose of blades 57 and 56 of Figs. 1 and 2. Thus, except for the function of blades 61 and 60, the structure shown in Fig. 3 performs the same function as the structure shown in Figs. 1 and 2.

In the present embodiments, I employ a lubricant of the proper viscosity for attaining the function described and also for lubricating the moving parts.

While the forms of embodiments of the present invention as herein disclosed constitute preferred forms, it is to be understood that other

I claim:

1. A power transmission mechanism, comprising in combination, an element forming a housing containing liquid; planetary gearing in the housing including a sun gear element, a ring gear element, a rotatable planetary gear carrier and a planetary gear element rotatably carried by the carrier connecting the sun and ring gear elements; a shaft connected with the sun gear and housing elements for rotation therewith; a shaft connected with the planetary gear carrier; and juxtaposed sets of blades within the housing and rotatable in the liquid, one of said sets of blades being connected for rotation by one of said elements and the other being connected with the gear carrier.

2. A power transmission mechanism, comprising in combination, an element forming a housing containing liquid; planetary gearing in the housing including a sun gear element, a ring gear element, a rotatable planetary gear carrier and a planetary gear element rotatably carried by the carrier connecting the sun and ring gear elements; a shaft connected with the sun gear and housing elements for rotation therewith; a shaft connected with the planetary gear carrier; and juxtaposed sets of blades within the housing and rotatable in the liquid, one of said sets of blades being connected with said gear carrier and the other being connected for rotation by the housing.

3. A power transmission mechanism, comprising in combination, an element forming a housing containing liquid; planetary gearing in the housing including a sun gear element, a ring gear element, a rotatable planetary gear carrier and a planetary gear element rotatably carried by the carrier connecting the sun and ring gear elements; a shaft connected with the sun gear and housing elements for rotation therewith; a shaft connected with the planetary gear carrier; and juxtaposed sets of blades within the housing and rotatable in the liquid, one of said sets of blades being carried by the housing, another of said sets of blades being connected with the ring gear element and the third set being connected with the gear carrier.

4. A power transmission mechanism, comprising in combination, a gear housing containing a liquid; planetary gearing in the housing including a sun gear, a ring gear and a planetary gear connecting the sun and ring gear; a shaft connected to the sun gear and housing for rotation therewith; a flange carrying the planetary gear; a shaft connected in driving relation with the flange; a circularly arranged set of blades carried by the flange adjacent the periphery thereof; a circularly arranged set of blades carried by the ring gear adjacent the periphery thereof; and circularly arranged blade means carried by the housing and juxtaposed to the blades on the flange and the blades on the ring gear, parts of said sets of blades and blade means being immersed in the liquid.

5. A power transmission mechanism, comprising in combination, a gear housing containing a liquid; planetary gearing in the housing including a sun gear, a ring gear and a planetary gear connecting the sun and ring gears; a shaft connected to the sun gear and housing for rotation therewith; a flange driven by the planetary gears; a shaft connected with the flange; sets of blades within the housing and rotatable in the liquid, one of said sets being connected to the flange and the other set being connected with the ring gear; and additional sets of blades within the housing and rotatable in the liquid, said latter mentioned sets being connected with the housing for rotation with the housing and interposed between the first and second mentioned sets.

BENJAMIN T. NEAL.

References Cited in the file of this patent

UNITED STATES PATENTS

| Number | Name | Date |
|---|---|---|
| 1,203,265 | Radcliffe | Oct. 31, 1916 |
| 1,271,079 | Radcliffe | July 2, 1918 |
| 2,005,444 | Weiss | June 18, 1935 |
| 2,283,486 | Berry | May 19, 1942 |
| 2,303,829 | Dodge | Dec. 1, 1942 |
| 2,368,873 | Pollard | Feb. 6, 1945 |
| 2,431,318 | Ellis | Nov. 25, 1947 |